United States Patent
Hyun et al.

(10) Patent No.: US 10,065,614 B2
(45) Date of Patent: Sep. 4, 2018

(54) SYSTEM AND METHOD FOR VARIABLY CONTROLLING REGENERATIVE BRAKING

(71) Applicant: Hyundai Motor Company, Seoul (KR)

(72) Inventors: Ba Ro Hyun, Gyeonggi-do (KR); Sung Jae Kim, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 220 days.

(21) Appl. No.: 14/959,414

(22) Filed: Dec. 4, 2015

(65) Prior Publication Data

US 2016/0347294 A1    Dec. 1, 2016

(30) Foreign Application Priority Data

May 29, 2015 (KR) .................. 10-2015-0076151

(51) Int. Cl.
| | |
|---|---|
| *B60T 7/22* | (2006.01) |
| *B60T 8/171* | (2006.01) |
| *B60T 1/10* | (2006.01) |
| *F16D 61/00* | (2006.01) |

(52) U.S. Cl.
CPC .................. *B60T 7/22* (2013.01); *B60T 1/10* (2013.01); *B60T 8/171* (2013.01); *F16D 61/00* (2013.01); *B60T 2201/022* (2013.01); *B60T 2210/32* (2013.01); *B60T 2270/60* (2013.01)

(58) Field of Classification Search
CPC .. G08G 1/166; G08G 1/167; G08G 1/096725; G08G 1/096766; G08G 1/163; G08G 1/0112; G08G 1/0129; G08G 1/0133; G08G 1/096791; G08G 1/162; G08G 1/202; G08G 1/22; G08G 5/0043; B60R 1/00

See application file for complete search history.

(56) References Cited

U.S. PATENT DOCUMENTS

| | | | |
|---|---|---|---|
| 9,052,713 B2 | 6/2015 | Schuiz et al. | |
| 2005/0123173 A1 | 6/2005 | Isaji et al. | |
| 2013/0041576 A1* | 2/2013 | Switkes | G08G 1/166 |
| | | | 701/123 |
| 2014/0067225 A1 | 3/2014 | Lee et al. | |

(Continued)

FOREIGN PATENT DOCUMENTS

| | | |
|---|---|---|
| JP | H 9-267686 | 10/1997 |
| JP | 2002-308009 A | 10/2002 |

(Continued)

*Primary Examiner* — Jelani A Smith
*Assistant Examiner* — Mathew Franklin Gordon
(74) *Attorney, Agent, or Firm* — Mintz Levin Cohn Ferris Glovsky and Popeo, P.C.; Peter F. Corless

(57) ABSTRACT

A system and method for variably controlling regenerative braking are provided. The system includes an imaging device that is configured to generate image information by photographing a front vehicle and a road situation and an accelerometer that is configured to sense acceleration of the front vehicle or a subject vehicle. A radar sensor is configured to sense a distance between the front vehicle and the subject vehicle. A vehicle controller is configured to recognize the acceleration of the front vehicle or the subject vehicle, the distance between the front vehicle and the subject vehicle, and whether a brake light of the front vehicle is turned on, to determine whether to actively decelerate the subject vehicle, and execute active deceleration.

10 Claims, 4 Drawing Sheets

(56) References Cited

U.S. PATENT DOCUMENTS

| | | | | |
|---|---|---|---|---|
| 2014/0236449 A1* | 8/2014 | Horn | ................... | G08G 5/0043 |
| | | | | 701/96 |
| 2014/0350809 A1* | 11/2014 | Tamaru | ................... | B60T 7/22 |
| | | | | 701/67 |
| 2014/0379233 A1* | 12/2014 | Chundrlik, Jr. | ......... | B60T 8/171 |
| | | | | 701/70 |
| 2015/0081605 A1 | 3/2015 | Im et al. | | |
| 2015/0175161 A1* | 6/2015 | Breed | ................... | B60W 30/09 |
| | | | | 348/148 |

FOREIGN PATENT DOCUMENTS

| | | |
|---|---|---|
| JP | 2005-170154 A | 6/2005 |
| JP | 2006-281898 A | 10/2006 |
| JP | 2012-214181 A | 11/2012 |
| KR | 10-1999-0051911 | 7/1999 |
| KR | 10-1999-0076190 | 10/1999 |
| KR | 10-0966860 | 6/2010 |
| KR | 10-2013-0054637 A | 5/2013 |
| KR | 10-2013-0058362 | 6/2013 |
| KR | 10-2014-0005112 A | 1/2014 |
| KR | 10-2014-0029640 A | 3/2014 |
| KR | 10-2015-0031051 A | 3/2015 |
| KR | 10-1509700 B1 | 4/2015 |
| KR | 10-1558772 | 10/2015 |
| KR | 10-1628563 B1 | 6/2016 |

\* cited by examiner

US 10,065,614 B2

SYSTEM AND METHOD FOR VARIABLY CONTROLLING REGENERATIVE BRAKING

CROSS-REFERENCE TO RELATED APPLICATION

This application is based on and claims the benefit of priority to Korean Patent Application No. 10-2015-0076151, filed on May 29, 2015, in the Korean Intellectual Property Office, the disclosure of which is incorporated herein in its entirety by reference.

TECHNICAL FIELD

The present disclosure relates to a system and method for variably controlling regenerative braking, and more particularly, to an active deceleration control technique capable of determining whether a subject vehicle may perform coasting based on a preceding vehicle.

BACKGROUND

Currently, as the concern of high oil prices increase, fuel efficiency for vehicles is continuously being researched. Methods for increasing fuel efficiency of vehicles include designing highly efficient vehicles and effectively driving a vehicle by a driver. One of the methods for effectively driving a vehicle maximally uses inertial driving (e.g., coasting operation, engine brake) when a user brakes the vehicle.

In other words, for braking based on inertial driving, braking is performed with basic resistance force such as rolling resistance or air resistance, additional energy based on the braking operation is not consumed. Thus, when braking based on inertial driving is used, fuel efficiency of a vehicle may increase. However, in general, when a preceding vehicle stops, a driver may not be able to determine whether braking may be performed only through inertial driving. When a preceding vehicle stops, a general driver is unable determine whether a subject vehicle should be stopped by operating a brake pedal or whether the subject vehicle may be braked only through inertial driving.

Accordingly, a device, which may inform a driver about whether braking may be sufficiently performed only through inertial driving based on a distance to a preceding vehicle and a driving condition of a subject vehicle to be controlled, is required.

SUMMARY

The present disclosure provides a system and method for variably controlling regenerative braking for the purpose of active deceleration control to determine whether a subject vehicle may perform coasting based on a distance to a preceding vehicle.

Technical subjects of the present disclosure are not limited to the foregoing technical subjects and any other technical subjects not mentioned will be understood from the following descriptions and become apparent by exemplary embodiments of the present invention. Also, it may be easily understood that the advantages, features and aspects of the present invention may be realized by means and combinations demonstrated in claims.

According to an exemplary embodiment of the present disclosure, a system for variably controlling regenerative braking may include: an imaging device (e.g., a camera, video camera, or the like) configured to generate image information by photographing a front vehicle and a road situation; an accelerometer configured to sense acceleration of the front vehicle or a subject vehicle; a radar sensor configured to sense a distance between the front vehicle and the subject vehicle; and a vehicle controller configured to recognize the acceleration of the front vehicle or the subject vehicle, the distance between the front vehicle and the subject vehicle, and whether a brake light of the front vehicle is turned on, determine whether to actively decelerate the subject vehicle, and execute active deceleration.

The vehicle controller may include: a vehicle load model unit configured to calculate a current speed of the subject vehicle using the acceleration of the front vehicle or the subject vehicle received via the accelerometer; a coasting distance model unit configured to compare a coasting enable distance (e.g., baseline) calculated based on the current speed of the subject vehicle received from the vehicle load model unit with the distance between the front vehicle and the subject vehicle; a coasting enable unit configured to determine whether coasting is controllable using information from the comparison between the coasting enable distance and the distance between the front vehicle and the subject vehicle received from the coasting distance model unit; and a front vehicle model unit configured to determine whether the brake light of the front vehicle is turned on to determine whether the front vehicle is decelerated, and determine whether to actively decelerate the subject vehicle.

The coasting enable unit may be connected to a clutch controller of the subject vehicle to determine whether to actively decelerate the subject vehicle. The front vehicle model unit may be connected to a motor controller, a transmission controller, a brake controller, or an engine controller to determine whether to actively decelerate the subject vehicle. The front vehicle model unit may include a brake light tracking unit configured to track the brake light of the front vehicle from the image information obtained by the imaging device to determine whether the brake light is turned on.

According to another exemplary embodiment of the present disclosure, a method for variably controlling regenerative braking may include: calculating a current speed of a subject vehicle using acceleration of a front vehicle or the subject vehicle received via an accelerometer; comparing a coasting enable distance (baseline) calculated based on the current speed of the subject vehicle with a distance between the front vehicle and the subject vehicle; determining whether coasting is controllable using received information from the comparison between the coasting enable distance and the distance between the front vehicle and the subject vehicle; and determining whether a brake light of the front vehicle is turned on to determine whether the front vehicle is decelerated and determine whether to actively decelerate the subject vehicle.

In the comparison of the coasting enable distance calculated based on the current speed of the subject vehicle with the distance between the front vehicle and the subject vehicle, when the calculated coasting enable distance is equal to or greater than the distance between the front vehicle and the subject vehicle, the subject vehicle may be informed of the coasting enable distance.

The determination of whether the coasting is controllable may include: comparing the coasting enable distance calculated based on the current speed of the subject vehicle, the distance between the front vehicle and the subject vehicle, and a preset safe distance over which the front vehicle and the subject vehicle are to maintain at the least, and determining whether an accelerator pedal of the subject vehicle is in an ON or OFF state (e.g., whether the accelerator pedal is engaged or disengaged) when the coasting enable distance is greater than the distance between the front vehicle and the subject vehicle by the safe distance.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
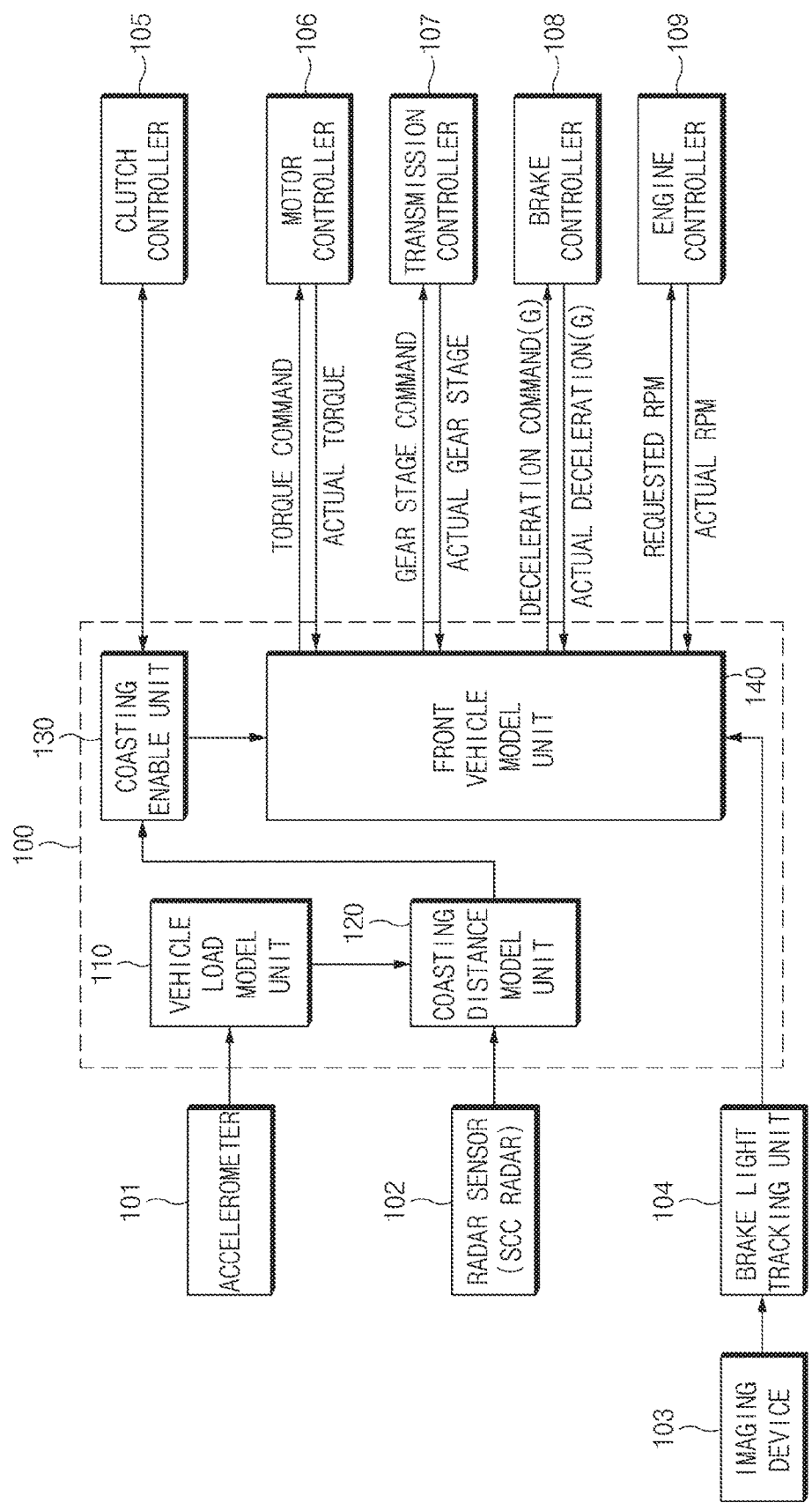
FIG. 1 is a diagram illustrating a system for variably controlling regenerative braking according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The aforementioned objects, features and advantages of the present disclosure will become more apparent through the following detailed description with reference to the accompanying drawings, and accordingly, a technical concept of the present disclosure may be easily practiced by those skilled in the art to which the present invention pertains. In describing the exemplary embodiments of the present disclosure, when it is determined that a detailed description of known components or functions associated with the present disclosure unnecessarily obscures the gist of the present disclosure, the detailed description thereof will be omitted. Hereinafter, the exemplary embodiments of the present disclosure will be described in detail with reference to the accompanying drawings.

FIG. 1 is a block diagram illustrating a system for variably controlling regenerative braking according to an exemplary embodiment of the present disclosure. Referring to FIG. 1, a system for variably controlling regenerative braking may include a vehicle controller 100, and the vehicle controller 100 may include a vehicle load model unit 110, a coasting distance model unit 120, a coasting enable unit 130, and a front vehicle model unit 140.

The vehicle controller 100 may also be referred to as a hybrid controller configured to receive acceleration with respect to a front vehicle or a subject vehicle via an accelerometer 101 and receive information regarding a distance between the front vehicle and the subject vehicle via a radar sensor 102 (e.g., SCC radar sensor). Further, the vehicle load modeling unit 110 may be configured to calculate a current speed of the subject vehicle using the acceleration of the front vehicle or the subject vehicle received through the accelerometer.

The coasting distance model unit 120 may be configured to compare a coasting enable distance (e.g., a baseline) calculated based on the current speed of the subject vehicle received from the vehicle load model unit 110 with the distance between the front vehicle and the subject vehicle. The coasting enable unit 130 may further be configured to determine whether coasting is controllable (e.g., whether the subject vehicle may perform coasting) using the information obtained by comparing the coasting enable distance received from the coasting distance model unit 120 with the distance between the front vehicle and the subject vehicle. In other words, the coasting enable unit 130 may be configured to detect a coasting enable distance and may be connected to the clutch controller 105 to determine whether coasting of the subject vehicle may be executed.

Additionally, the coasting enable unit 130 may be connected to the clutch controller 105 of the subject vehicle to determine whether to actively decelerate the subject vehicle. The front vehicle model unit 140 may be configured to determine whether a brake light of the front vehicle is turned on to determine whether the front vehicle is decelerated, and determine whether to actively decelerate the subject vehicle. The front vehicle model unit 140 may be connected to a sensor part including an internal imaging device 103 of the subject vehicle and may be configured to continuously track the brake light of the front vehicle 104. In addition, the front vehicle model unit 140 may be connected to a motor controller 106, a transmission controller 107, a brake controller 108, or an engine controller 109 of the subject vehicle to determine whether to actively decelerate the subject vehicle.

Figure 2:
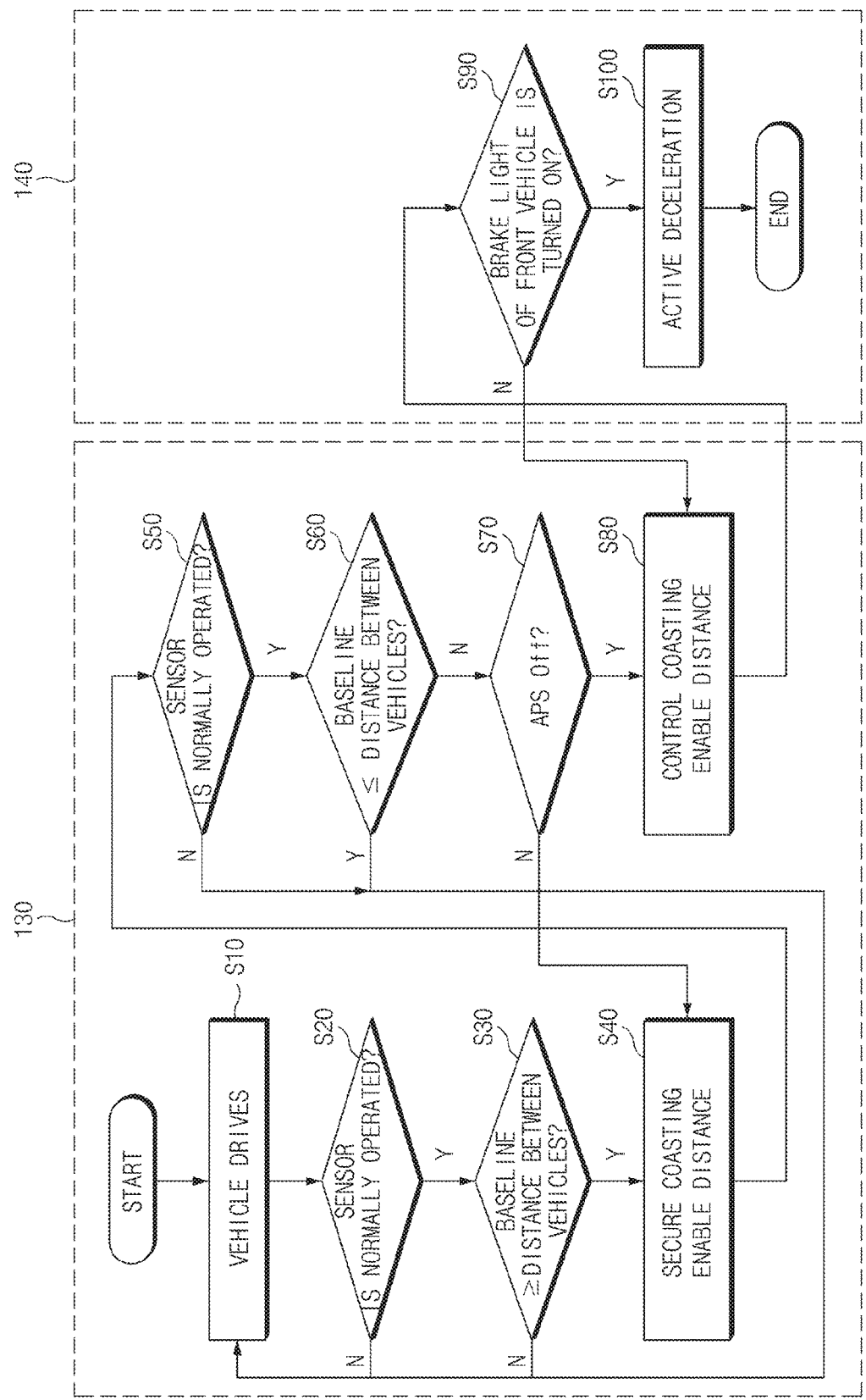
FIG. 2 is a flow chart illustrating a method for operating a coasting available part and a front vehicle model unit in the system for variably controlling regenerative braking according to an exemplary embodiment of the present disclosure.

FIG. 2 is a flow chart illustrating a method for operating a coasting enable unit and a front vehicle model unit in the system for variably controlling regenerative braking according to an exemplary embodiment of the present disclosure. Referring to FIG. 2, to determine whether to control (e.g., execute) coasting of the subject vehicle, the following method may be performed.

When the subject vehicle is being driven, the vehicle controller may be configured to determine whether various sensors including an accelerometer, a radar sensor, or the imaging device are operated normally (e.g., without failure or error) in operations S10 and S20. When various sensors disposed within the subject vehicle are operated normally, the coasting distance model unit may be configured to compare a coasting enable distance (baseline) calculated based on a current speed of the subject vehicle with a distance between the front vehicle and the subject vehicle in operation S30. In particular, when the coasting enable distance calculated based on the current speed of the subject vehicle is equal to or greater than the distance between the front vehicle and the subject vehicle, the subject vehicle may be notified that a coasting enable distance of the subject vehicle is secured in operation S40.

Further, before variably executing regenerative braking, the vehicle controller may be configured to determine whether various sensors including the accelerometer, the radar sensor, or the imaging device are operated normally again in operation S50. When the various sensors provided in the subject vehicle are operated normally, the coasting enable unit may be configured to compare the coasting enable distance calculated based on the current speed of the subject vehicle, the distance between the front vehicle and the subject vehicle, and a preset safe distance (e.g., delta) over which the front vehicle and the subject vehicle should maintain at the least in operation S60.

Thereafter, according to the result of the comparison between the coasting enable distance, the distance between the front vehicle and the subject vehicle, and the preset safe distance, when the coasting enable distance is greater than a distance obtained by subtracting the safe distance (delta) from the distance between the front vehicle and the subject vehicle, the coasting enable unit may be configured to determine whether an accelerator pedal sensor (APS) of the subject vehicle is in an ON or OFF state (e.g., whether the pedal is engaged or disengaged) in operation S70.

When the APS is in the OFF state (e.g., disengaged), the coasting enable unit may be configured to determine that the coasting enable distance of the subject vehicle is controllable, and variably detect the coasting enable distance in operation S80. After the coasting enable unit variably detects the coasting enable distance, the front vehicle model unit may be configured to determine whether a brake light of the front vehicle is turned on using the imaging device of the subject vehicle to determine whether the front vehicle is decelerated in operation S90.

When the brake light of the front vehicle is turned on, the front vehicle model unit may be configured to actively decelerate the subject vehicle in operation S100. In particular, the coasting enable unit, which has received the distance and speed information from the accelerometer and the SCC radar sensor, and the front vehicle model unit, which has received information regarding whether the brake light of the front vehicle was turned on, from the imaging device sensor, may be configured to sequentially receive information regarding a distance between the subject vehicle and the front vehicle and the speeds of the subject vehicle and the front vehicle to determine whether to actively decelerate the subject vehicle. Alternatively, the controller may be configured to simultaneously process or analyze the information regarding the distance between the subject vehicle and the front vehicle and speeds of the subject vehicle and the front vehicle to determine whether to actively decelerate the subject vehicle.

Figure 3:
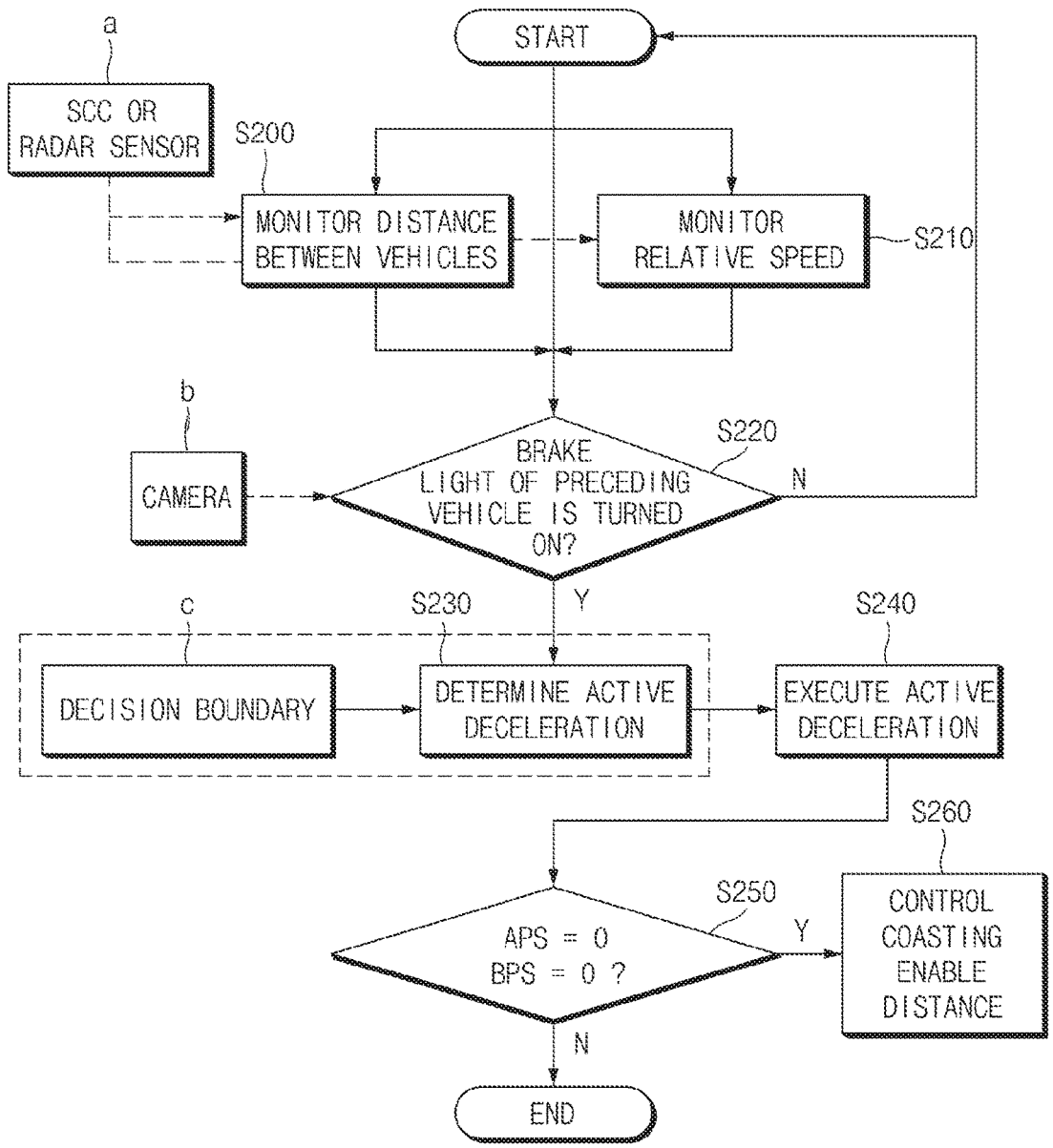
FIG. 3 is a flow chart illustrating a method for operating the system for variably controlling regenerative braking according to an exemplary embodiment of the present disclosure.

FIG. 3 is a flow chart illustrating a method for operating the system for variably controlling regenerative braking according to an exemplary embodiment of the present disclosure. Referring to FIG. 3, the vehicle controller may be configured to receive acceleration of the front vehicle or acceleration of the subject vehicle, monitor relative speeds between the front vehicle and the subject vehicle, and monitor a distance between the front vehicle and the subject vehicle using the accelerometer and the radar sensor (a) in operations S200 and S210.

In particular, the coasting enable unit of the vehicle controller may be configured to determine whether coasting is controllable using information obtained by comparing a coasting enable distance received from the coasting distance model unit and the distance between the front vehicle and the subject vehicle. Additionally, the vehicle controller may be configured to receive information regarding whether a brake light of the front vehicle is turned on using the imaging device (b) in operation S220.

Thereafter, the vehicle controller may further be configured to determine whether to actively decelerate the subject vehicle by recognizing acceleration information regarding the front vehicle and the subject vehicle, the distance between the front vehicle and the subject vehicle, and whether the brake light of the front vehicle is turned on, and execute active deceleration in operations S230 and S240. In particular, the front vehicle model unit of the vehicle controller may be configured to determine whether the front vehicle is decelerated by determining whether a brake light of the front vehicle is turned on, determine whether to actively decelerate the subject vehicle, and execute active deceleration.

To determine and execute active deceleration, a decision boundary (c) setting method may be used, details of which will be described in detail with reference to FIG. 4. After the subject vehicle executes active deceleration, when both the accelerator pedal sensor (APS) and the brake pedal sensor (BPS) of the subject vehicle are in an OFF state (e.g., disengaged) or 0 (e.g., no pressure is exerted onto the pedals), the vehicle controller may be configured to determine that the subject vehicle is enabled for coasting, and variably detect a coasting enable distance in operations S250 and S260.

Figure 4:
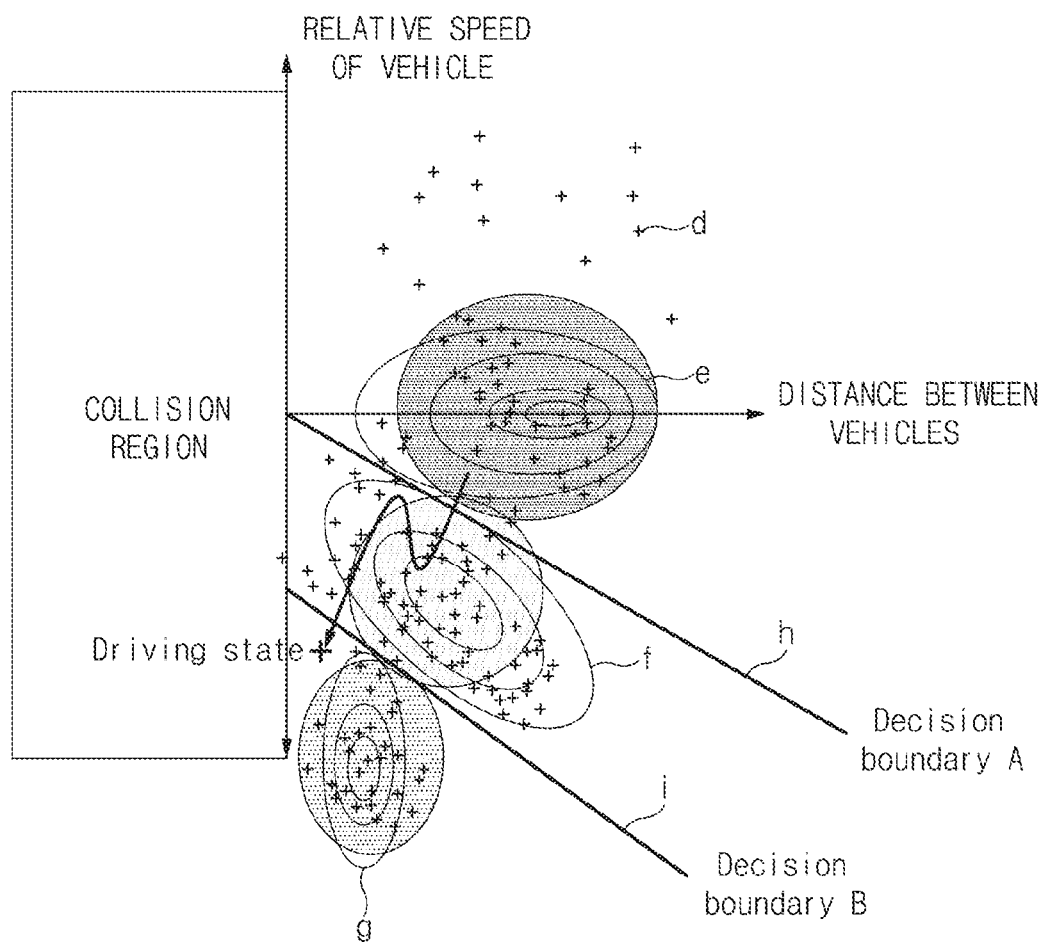
FIG. 4 is a view illustrating a method for setting a decision boundary and a method for determining active deceleration strategy in the system for variably controlling regenerative braking according to an exemplary embodiment of the present disclosure.

FIG. 4 is a view illustrating a method for setting a decision boundary and a method for determining active deceleration in the system for variably controlling regenerative braking according to an exemplary embodiment of the present disclosure. Referring to FIG. 4, in the method for determining active deceleration of the subject vehicle, the Y axis represents a relative speed (e.g., acceleration) between the subject vehicle and the front vehicle and the X axis represents a distance between the subject vehicle and the front vehicle based on a point in time (e.g., collision region) at which the subject vehicle collides with the front vehicle, which may be expressed by a two-dimensional (2D) coordinate system.

Particularly, referring to the Y axis, as the front vehicle is increasingly accelerated or as the subject vehicle is increasingly decelerated, driving data become distant from the point in time (e.g., collision region) at which the subject vehicle may collide with the front vehicle, and as the front vehicle is increasingly decelerated or as the subject vehicle is increasingly accelerated, driving data approaches to the point in time (e.g., collision region) at which the subject vehicle may collide with the front vehicle.

In the method for determining active deceleration of the subject vehicle, the disclosed driving data (d) may be classified into three data groups (e.g., clustering), and the data groups (or clusters) may be classified into a first data group (e), a second data group (f), and a third data group (g) using a k-nearest neighbor technique. Additionally, two decision boundaries may be defined among the data groups. The decision boundaries may be defined by a primary function (y=ax+b) and may include a first decision boundary (h) and a second decision boundary (i). In particular, the decision boundaries may be variously classified based on the numbers of data groups, and the number of pieces of driving data may also be adjusted.

As for the method for determining active deceleration of the subject vehicle, a first method for determining active deceleration of the subject vehicle may be used between the X axis and the first decision boundary (h), a second method for determining active deceleration of the subject vehicle may be used between the first decision boundary (h) and the second decision boundary (i), and a third method for determining active deceleration of the subject vehicle may be used between the second decision boundary (i) and the Y axis, and active deceleration method may be varied based on the data groups (clusters).

As described above, according to the exemplary embodiments of the present disclosure, by actively controlling or adjusting deceleration of the subject vehicle, unnecessary energy consumption may be prevented and fuel efficiency during driving may be enhanced. In addition, a degree of deceleration based on a distance between the subject vehicle and the front vehicle may be recognized within a shortest time to cope with a corresponding situation, an accident between vehicles may be prevented.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for variably controlling regenerative braking, comprising:
    an imaging device configured to generate image information by photographing a front vehicle and a road situation;
    an accelerometer configured to sense acceleration of the front vehicle or a subject vehicle;
    a radar sensor configured to sense a distance between the front vehicle and the subject vehicle; and
    a vehicle controller configured to recognize the acceleration of the front vehicle or the subject vehicle, the distance between the front vehicle and the subject vehicle, and whether a brake light of the front vehicle is turned on, to determine whether to actively decelerate the subject vehicle, and execute active deceleration, wherein a decision boundary setting method is used to determine whether to actively decelerate the subject vehicle, and execute active deceleration using the acceleration of the front vehicle or the subject vehicle, and the distance between the front vehicle and the subject vehicle, and
    wherein the vehicle controller is further configured to:
        a vehicle load model unit configured to calculate a current speed of the subject vehicle using the acceleration of the front vehicle of the subject vehicle received via the accelerometer;
        a coasting distance model unit configured to compare a costing enable distance calculated based on the current speed of the subject vehicle with the distance between the front vehicle and the subject vehicle;
        a coasting enable unit configured to determine whether coasting is controllable using information from the comparison between the coasting enable distance and the distance between the front vehicle and the subject vehicle; and
        a front vehicle model unit configured to determine whether the break light of the front vehicle is turned on to determine whether the front vehicle is decelerated, and determine whether to actively decelerate the subject vehicle.

2. The system according to claim 1, wherein the coasting enable unit is connected to a clutch controller of the subject vehicle to determine whether to actively decelerate the subject vehicle.

3. The system according to claim 1, wherein the front vehicle model unit is connected to a motor controller, a transmission controller, a brake controller, or an engine controller to determine whether to actively decelerate the subject vehicle.

4. The system according to claim 1, wherein the front vehicle model unit includes a brake light tracking unit configured to track the brake light of the front vehicle from the image information obtained by the imaging device to determine whether the brake light is turned on.

5. A method for variably controlling regenerative braking, comprising:
    calculating, by a controller, a current speed of a subject vehicle using acceleration information of a front vehicle or the subject vehicle received via an accelerometer;
    comparing, by the controller, a coasting enable distance calculated based on the current speed of the subject vehicle with a distance between the front vehicle and the subject vehicle;
    determining, by the controller, whether coasting is controllable using received information from the comparison between the coasting enable distance and the distance between the front vehicle and the subject vehicle; and
    determining, by the controller, whether a brake light of the front vehicle is turned on to determine whether the front vehicle is decelerated and determine whether to actively decelerate the subject vehicle,
    wherein a decision boundary setting method is used to determine whether to actively decelerate the subject vehicle, and execute active deceleration using the acceleration of the front vehicle or the subject vehicle, and the distance between the front vehicle and the subject vehicle.

6. The method according to claim 5, wherein, in the comparison of the coasting enable distance calculated based on the current speed of the subject vehicle with the distance between the front vehicle and the subject vehicle, when the calculated coasting enable distance is equal to or greater than the distance between the front vehicle and the subject vehicle, the subject vehicle is informed of the coating enable distance.

7. The method according to claim 5, wherein the determination of whether the coasting is controllable includes:
comparing, by the controller, the coasting enable distance calculated based on the current speed of the subject vehicle, the distance between the front vehicle and the subject vehicle, and a preset safe distance between the front vehicle and the subject vehicle, and determining whether an accelerator pedal of the subject vehicle is in an ON or OFF state when the coasting enable distance is greater than the distance between the front vehicle and the subject vehicle by the safe distance.

8. A non-transitory computer readable medium containing program instructions executed by a controller, the computer readable medium comprising:
program instructions that calculate a current speed of a subject vehicle using acceleration information of a front vehicle or the subject vehicle received via an accelerometer;
program instructions that compare a coasting enable distance calculated based on the current speed of the subject vehicle with a distance between the front vehicle and the subject vehicle;
program instructions that determine whether coasting is controllable using received information from the comparison between the coasting enable distance and the distance between the front vehicle and the subject vehicle; and
program instructions that determine whether a brake light of the front vehicle is turned on to determine whether the front vehicle is decelerated and determine whether to actively decelerate the subject vehicle,
wherein a decision boundary setting method is used to determine whether to actively decelerate the subject vehicle, and execute active deceleration using the acceleration of the front vehicle or the subject vehicle, and the distance between the front vehicle and the subject vehicle.

9. The non-transitory computer readable medium of claim 8, wherein, in the comparison of the coasting enable distance calculated based on the current speed of the subject vehicle with the distance between the front vehicle and the subject vehicle, when the calculated coasting enable distance is equal to or greater than the distance between the front vehicle and the subject vehicle, the subject vehicle is informed of the coating enable distance.

10. The non-transitory computer readable medium of claim 8, further comprising: program instructions that compare the coasting enable distance calculated based on the current speed of the subject vehicle, the distance between the front vehicle and the subject vehicle, and a preset safe distance between the front vehicle and the subject vehicle, and determine whether an accelerator pedal of the subject vehicle is in an ON or OFF state when the coasting enable distance is greater than the distance between the front vehicle and the subject vehicle by the safe distance.

* * * * *